US010981519B2

(12) United States Patent
Hayashida et al.

(10) Patent No.: US 10,981,519 B2
(45) Date of Patent: Apr. 20, 2021

(54) DRIVING ASSISTANCE APPARATUS AND VEHICLE

(71) Applicant: HONDA MOTOR CO., LTD., Tokyo (JP)

(72) Inventors: Yoshimasa Hayashida, Wako (JP); Makoto Sawada, Wako (JP); Masaru Aoki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/675,575

(22) Filed: Nov. 6, 2019

(65) Prior Publication Data

US 2020/0167114 A1    May 28, 2020

(30) Foreign Application Priority Data

Nov. 26, 2018  (JP) ............................... JP2018-220584

(51) Int. Cl.
*B60R 11/04* (2006.01)
*G06F 3/14* (2006.01)
(Continued)

(52) U.S. Cl.
CPC ............... *B60R 11/04* (2013.01); *B60R 1/00* (2013.01); *G06F 3/14* (2013.01); *G08G 1/167* (2013.01);
(Continued)

(58) Field of Classification Search
CPC .... B60R 2001/1215; B60R 2001/1253; B60R 1/1207; B60R 2300/305; B60R 2300/802; B60R 2300/8046
See application file for complete search history.

(56) References Cited

U.S. PATENT DOCUMENTS 2,016,763 A * 10/1935 Alexander ................ B60R 1/12
                                                              374/141
6,592,255 B1 * 7/2003 Duroux .................... B60R 1/12
                                                              374/109
(Continued)

FOREIGN PATENT DOCUMENTS

JP        2017-024464 A      2/2017

OTHER PUBLICATIONS

Author Unknown; Concerning the Adoption of Uniform Technical Prescriptions for Wheeled Vehicles, Equipment and Parts which can be Fitted and/or be Used on Wheeled Vehicles and the Conditions for Reciprocal Recognition of Approvals Granted on the Basis of these Prescriptions; Aug. 19, 2013; pp. 1-66; Regulation 46, Revision 5, E/ECE/324/Rev.1/Add.45/Rev.5-E/ECE/TRANS/505/Rev.1/Add.45/Rev.5; United Nations; Geneva, Switzerland.

(Continued)

*Primary Examiner* — David N Werner
(74) *Attorney, Agent, or Firm* — Thomas | Horstemeyer, LLP (57) ABSTRACT

A driving assistance apparatus installed in a vehicle, the apparatus comprising an image capturing unit configured to capture an image of a left-rearward area and a right-rearward area of the vehicle, a display unit configured to display an image capturing result from the image capturing unit as an image, and a control unit configured to control the driving of the display unit, wherein the control unit causes an icon for communicating predetermined information to a driver to be displayed over the image capturing result, at a position of a corner part corresponding to an upper part on a vehicle body side of the image displayed by the display unit.

9 Claims, 8 Drawing Sheets

(51) Int. Cl.
    *H04N 7/18*           (2006.01)
    *G08G 1/16*           (2006.01)
    *B60R 1/00*           (2006.01)
    *B60R 11/00*         (2006.01)
    *B60R 1/12*           (2006.01)

(52) U.S. Cl.
    CPC ........... *H04N 7/18* (2013.01); *B60K 2370/18* (2019.05); *B60K 2370/182* (2019.05); *B60K 2370/184* (2019.05); *B60K 2370/186* (2019.05); *B60K 2370/1868* (2019.05); *B60K 2370/1876* (2019.05); *B60R 2001/123* (2013.01); *B60R 2011/004* (2013.01); *B60R 2300/105* (2013.01); *B60R 2300/305* (2013.01); *B60R 2300/8046* (2013.01)

(56) References Cited

U.S. PATENT DOCUMENTS

| | | | | |
|---|---|---|---|---|
| 7,906,756 | B2* | 3/2011 | Drummond | B60R 1/088 |
| | | | | 250/214 AL |
| 8,083,386 | B2* | 12/2011 | Lynam | B60R 1/088 |
| | | | | 362/494 |
| 8,194,133 | B2* | 6/2012 | DeWind | B60K 35/00 |
| | | | | 348/148 |
| 8,282,226 | B2* | 10/2012 | Blank | B60R 1/12 |
| | | | | 359/879 |
| 8,525,703 | B2* | 9/2013 | McCarthy | B60R 1/12 |
| | | | | 340/995.1 |
| 9,019,091 | B2* | 4/2015 | McCarthy | G01S 19/37 |
| | | | | 340/425.5 |
| 9,469,195 | B1* | 10/2016 | Boss | B60K 35/00 |
| 2006/0056003 | A1* | 3/2006 | Tonar | G02F 1/161 |
| | | | | 359/265 |
| 2009/0002491 | A1* | 1/2009 | Haler | B60R 1/12 |
| | | | | 348/148 |
| 2014/0092251 | A1* | 4/2014 | Troxel | H04N 7/183 |
| | | | | 348/148 |
| 2014/0092299 | A1* | 4/2014 | Phillips | F16M 11/14 |
| | | | | 348/376 |
| 2015/0022665 | A1* | 1/2015 | Lu | B60R 1/00 |
| | | | | 348/148 |
| 2015/0051754 | A1* | 2/2015 | Kwon | B60K 37/06 |
| | | | | 701/2 |
| 2015/0191118 | A1* | 7/2015 | Matsukawa | G06T 3/40 |
| | | | | 348/148 |
| 2016/0318523 | A1* | 11/2016 | Kim | B60R 1/00 |
| 2016/0332562 | A1* | 11/2016 | Kim | B60Q 1/30 |
| 2017/0349098 | A1* | 12/2017 | Uhm | B60K 35/00 |
| 2017/0361764 | A1* | 12/2017 | Salter | B60Q 3/208 |
| 2018/0345790 | A1* | 12/2018 | Mimura | B60K 35/00 |
| 2019/0031051 | A1* | 1/2019 | Leaman | B60N 2/90 |
| 2019/0113743 | A1* | 4/2019 | Kumar | B60R 11/04 |
| 2019/0135180 | A1* | 5/2019 | Watatsu | B60R 1/12 |
| 2020/0238910 | A1* | 7/2020 | Wilson | B60S 1/04 |
| 2020/0252528 | A1* | 8/2020 | Wieczorek | H05B 3/145 |

OTHER PUBLICATIONS

Author Unknown; Uniform provisions concerning the approval of devices for indirect vision and of motor vehicles with regard to the installation of these devices; Nov. 10-13, 2015; pp. 1-88, ECE/TRANS/WP.29/2015/84, 167th Session, Item 4.7.3 of the provisional agenda; United Nations Economic and Social Council, Economic Commissions for Europe, Inland Transport Committee, World Forum for Harmonization of Vehicle Regulations; Geneva, Switzerland.

* cited by examiner

| CATEGORIES | ICON | ICON'S INDICATION | IMPORTANCE |
|---|---|---|---|
| RENDERING MODE | M11 | INDICATING NORMAL VIEW MODE, INDICATED AFTER BEING SET FOR A PREDETERMINED PERIOD | ★★ |
| | M12 | INDICATING WIDE-ANGLE VIEW MODE, INDICATED AFTER BEING SET FOR A PREDETERMINED PERIOD | |
| | M13 | INDICATING REVERSE VIEW MODE, INDICATED WHEN SHIFT POSITION "R" IS SET | |
| VISUAL FIELD RANGE ADJUSTING | M21 | INDICATING DURING ADJUSTING VISUAL FIELD RANGE | ★ |
| | M22 | INDICATING THAT VISUAL FIELD RANGE CANNOT BE ADJUSTED | |
| CAUTION | M31 | INFORM UNNATURAL TEMPERATURE (HOT) OF DISPLAY UNIT | ★★★ |
| | M32 | INFORM UNNATURAL TEMPERATURE (COLD) OF DISPLAY UNIT | |

FIG. 8

DRIVING ASSISTANCE APPARATUS AND VEHICLE

CROSS-REFERENCE TO RELATED APPLICATION(S)

This application claims priority to and the benefit of Japanese Patent Application No. 2018-220584, filed on Nov. 26, 2018, the entire disclosure of which is incorporated herein by reference.

BACKGROUND OF THE INVENTION

Field of the Invention

The present invention relates a driving assistance apparatus mainly installed in a vehicle.

Description of the Related Art

Some vehicles, such as four-wheeled automobiles, include driving assistance apparatuses known as camera monitoring systems (CMS) instead of side view mirrors. While the side view mirrors have enabled a driver to see what is happening behind his/her vehicle, the CMS is configured to be capable of displaying the area behind the vehicle as an image. Such a driving assistance apparatus includes, for example, a camera that captures an image of the area behind the vehicle, a monitor such as a liquid crystal display, and a controller that controls the driving of the monitor on the basis of the result of the camera capturing an image (see Japanese Patent Laid-Open No. 2017-24464).

Although the development and manufacturing of such vehicles is making progress, there is overall demand for further improvements in usability.

SUMMARY OF THE INVENTION

One exemplary object of the present invention is to improve the usability of a vehicle including a driving assistance apparatus, also called a CMS.

One of the aspects of the present invention provides a driving assistance apparatus installed in a vehicle, the apparatus comprising an image capturing unit configured to capture an image of a left-rearward area and a right-rearward area of the vehicle, a display unit configured to display an image capturing result from the image capturing unit as an image, and a control unit configured to control the driving of the display unit, wherein the control unit causes an icon for communicating predetermined information to a driver to be displayed over the image capturing result, at a position of a corner part corresponding to an upper part on a vehicle body side of the image displayed by the display unit.

Further features of the present invention will become apparent from the following description of exemplary embodiments with reference to the attached drawings.

DESCRIPTION OF THE EMBODIMENTS

Embodiments of the present invention will be described hereinafter with reference to the accompanying drawings. Note that the drawings are schematic diagrams illustrating the structure and configuration of the embodiments, and the dimensions depicted may not reflect the actual dimensions. In the accompanying drawings, like elements are given like reference signs, and redundant descriptions may be omitted from the specification.

Figure 1:
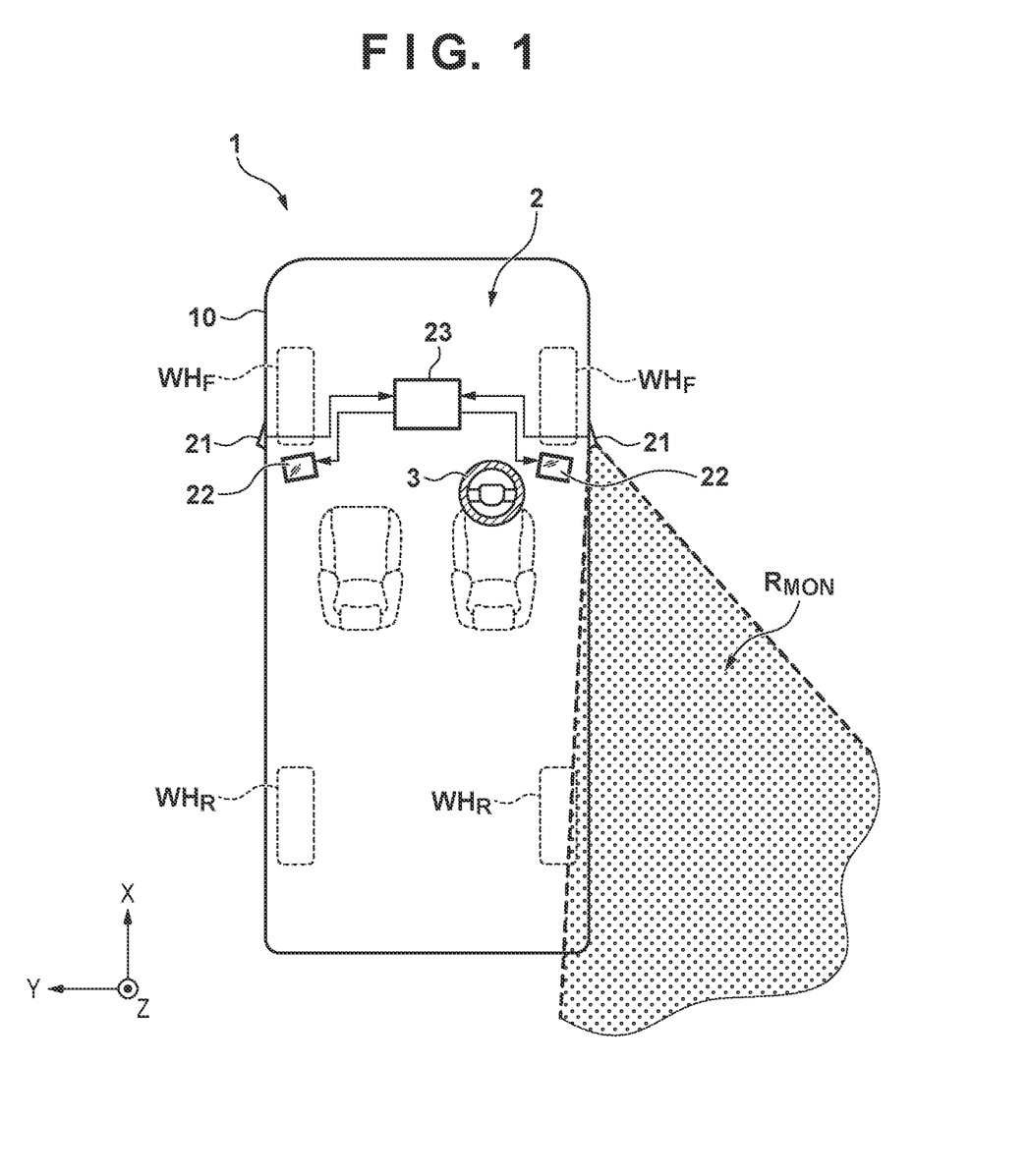
FIG. 1 is a schematic diagram illustrating an example of the configuration of a vehicle according to an embodiment.

FIG. 1 is a schematic diagram illustrating part of the configuration of a vehicle 1 according to this embodiment. In the present embodiment, the vehicle 1 is a four-wheeled vehicle including a pair of left and right front wheels WHF and a pair of left and right rear wheels WHR. However, the number of wheels is not limited thereto, and the following descriptions can be similarly applied to various vehicles, such as two-wheeled vehicles, three-wheeled vehicles, and more.

FIG. 1 shows an X axis, a Y axis, and a Z axis, which are orthogonal to each other, to make it easier to understand the structure (the same applies in the other drawings described later). An X direction corresponds to the front-and-rear direction of the vehicle body. A Y direction corresponds to the vehicle width direction, which is also the left-and-right direction of the vehicle body. A Z direction corresponds to the vertical direction, which is also the top-and-bottom direction of the vehicle body. In this specification, terms such as front/rear, left/right (side directions), and top/bottom indicate relative positional relationships that are based on a vehicle body 10 of the vehicle 1. For example, terms such as "front" and "forward" correspond to the +X direction, whereas terms such as "rear" and "rearward" correspond to the −X direction. A direction having only components parallel to the X direction and the Y direction is assumed to be the horizontal direction.

The vehicle 1 further includes a driving assistance apparatus 2. The driving assistance apparatus 2 includes cameras 21, monitors 22, and a control unit 23. The cameras 21 are configured to be capable of capturing images of an area to the rear of the vehicle 1 (the left-rearward area and the right-rearward area), and are provided as a pair on the left and right sides of the vehicle body 10. Known image capturing devices such as CCD image sensors, CMOS image sensors, or the like may be used for the cameras 21.

The monitors 22 are provided as a pair on the left and right, and are configured to be capable of displaying images (including both moving images and still images). Known display devices such as liquid crystal displays, organic EL displays, or the like may be used for the monitors 22.

The control unit 23 controls the driving of the monitors 22 on the basis of the results of the cameras 21 capturing images, and causes an image indicating what is happening in the area behind the vehicle 1 to be displayed in the monitors 22. For example, the control unit 23 generates image data on the basis of the result of the cameras 21 capturing images, or receives such image data from the cameras 21, and displays images in the monitors 22 on the basis of that image data.

In the present embodiment, the cameras 21 are fixed relative to the vehicle body 10. For example, the image capturing area RMON of the right-side camera 21 is fixed, and the driver can adjust the area displayed in the monitor 22 (i.e., the visual field range) using a predetermined implement. To rephrase this in terms of the control unit 23, part of the stated image data is trimmed by the control unit 23, and an image corresponding to that part is displayed in the monitor 22. When the driver uses the stated implement to adjust the visual field range, another part of the stated image data is trimmed, and an image corresponding to that part is displayed in the monitor 22, in response to that operation.

In the present embodiment, the control unit 23 is an electronic control unit (ECU) including a central processing unit (CPU) and memory, and is capable of controlling the monitors 22 by executing the above-described signal processing on the basis of predetermined programs. As another embodiment, a semiconductor device such as a programmable logic device (PLD) or an application-specific integrated circuit (ASIC) may be used for the control unit 23. In other words, the functions of the control unit 23 can be realized by software or hardware.

According to this driving assistance apparatus 2, the driver can understand what is happening behind the vehicle 1 by referring to the monitors 22 instead of side view mirrors. As a result, the driver can make left turns, right turns, lane changes, and the like by making turning operations using a steering wheel 3 as necessary. The driving assistance apparatus 2 is also called a "camera monitoring system (CMS)", "electronic mirrors", "digital mirrors", and so on.

As another embodiment, the stated cameras 21 may be a single camera instead of a pair of left and right cameras. In this case, a camera with a relatively wide angle of view is used as the camera 21, and the camera 21 is arranged on an upper part of the vehicle body 10 so as to be capable of capturing an image of a relatively broad area behind the vehicle 1.

To distinguish between the stated left and right pair of cameras 21, in the following, the left-side camera 21 will be referred to as a camera $21_L$, and the right-side camera 21 will be referred to as a camera $21_R$. Likewise, for the left and right pair of monitors 22, the left-side monitor 22 will be referred to as a monitor $22_L$, and the right-side monitor 22 will be referred to as a monitor $22_R$.

Figure 2:
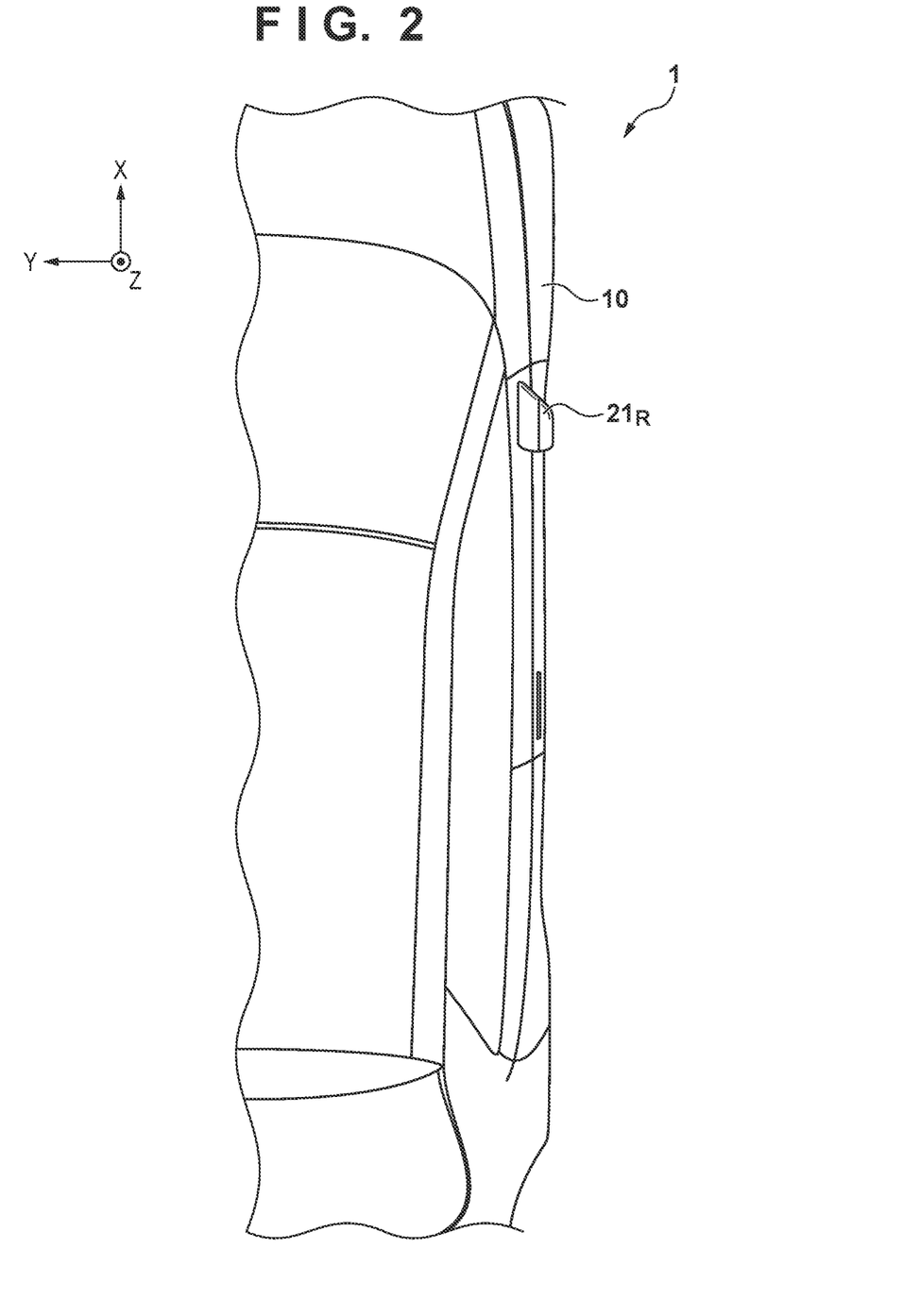
FIG. 2 is a top view illustrating part of the vehicle.
Figure 3:
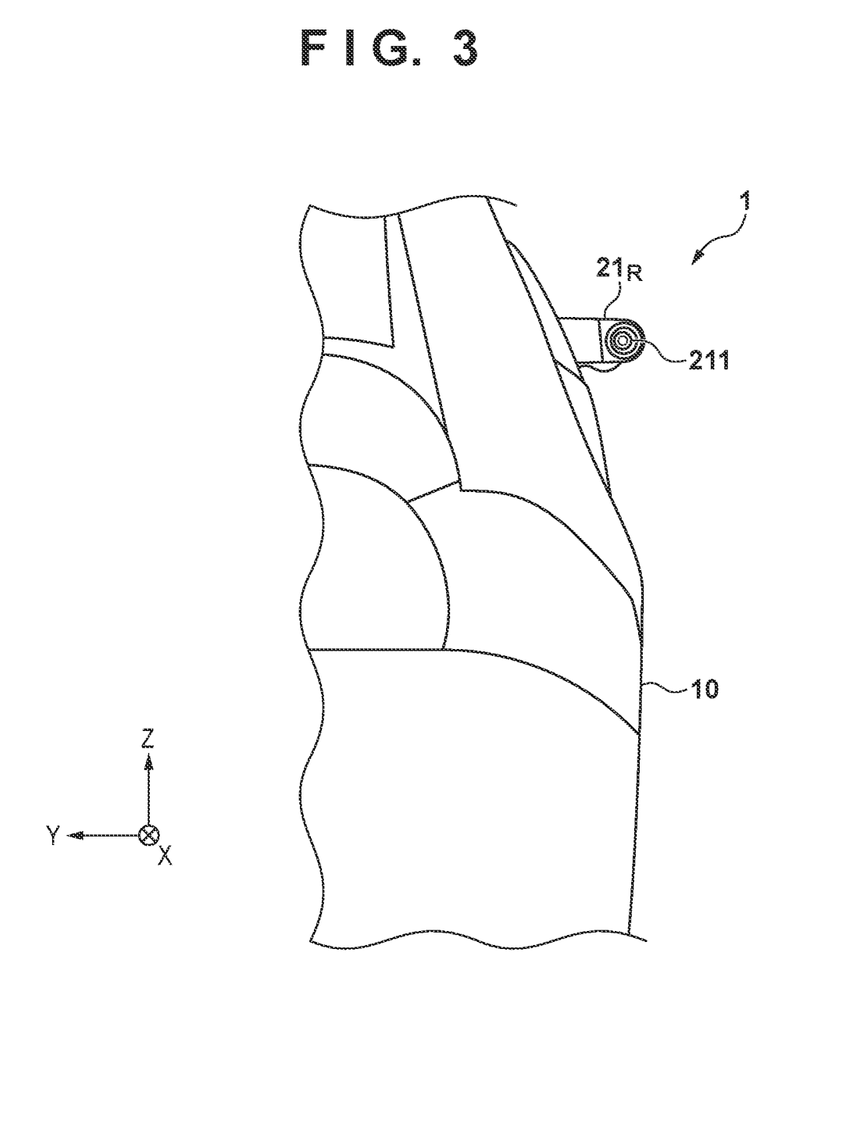
FIG. 3 is a rear view illustrating part of the vehicle.

FIG. 2 is a top view illustrating a right-side part of the vehicle body 10 (seen from the −Z direction), and FIG. 3 is a rear view of the same part (seen from the +X direction). The camera $21_R$ is provided on the outer right side of the vehicle body 10, with an optical axis or directional range of a lens 221 facing the right-rearward area. Note that the cameras $21_L$ and $21_R$ are provided with left-right symmetry, i.e., the above descriptions also apply to the left-side camera $21_L$.

The image signals obtained by the cameras $21_L$ and $21_R$ are output to the control unit 23 via wire harnesses or the like, and are synthesized into image data by the control unit 23. As another embodiment, the cameras $21_L$ and $21_R$ may include processors, and the image data may be generated by the processors in the cameras $21_L$ and $21_R$.

Figure 4:
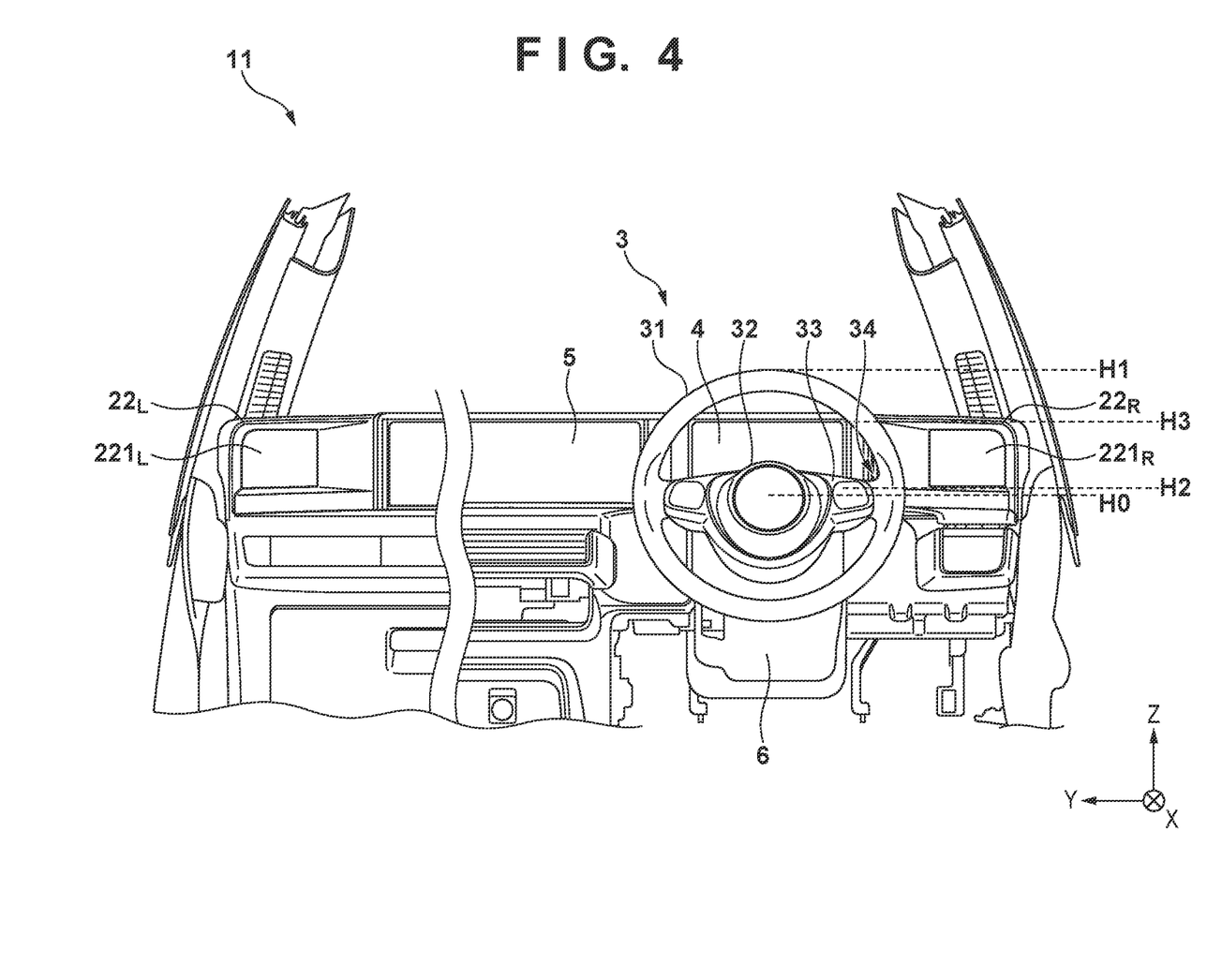
FIG. 4 is a rear view illustrating part of forward structure of the vehicle cabin.
Figure 5:
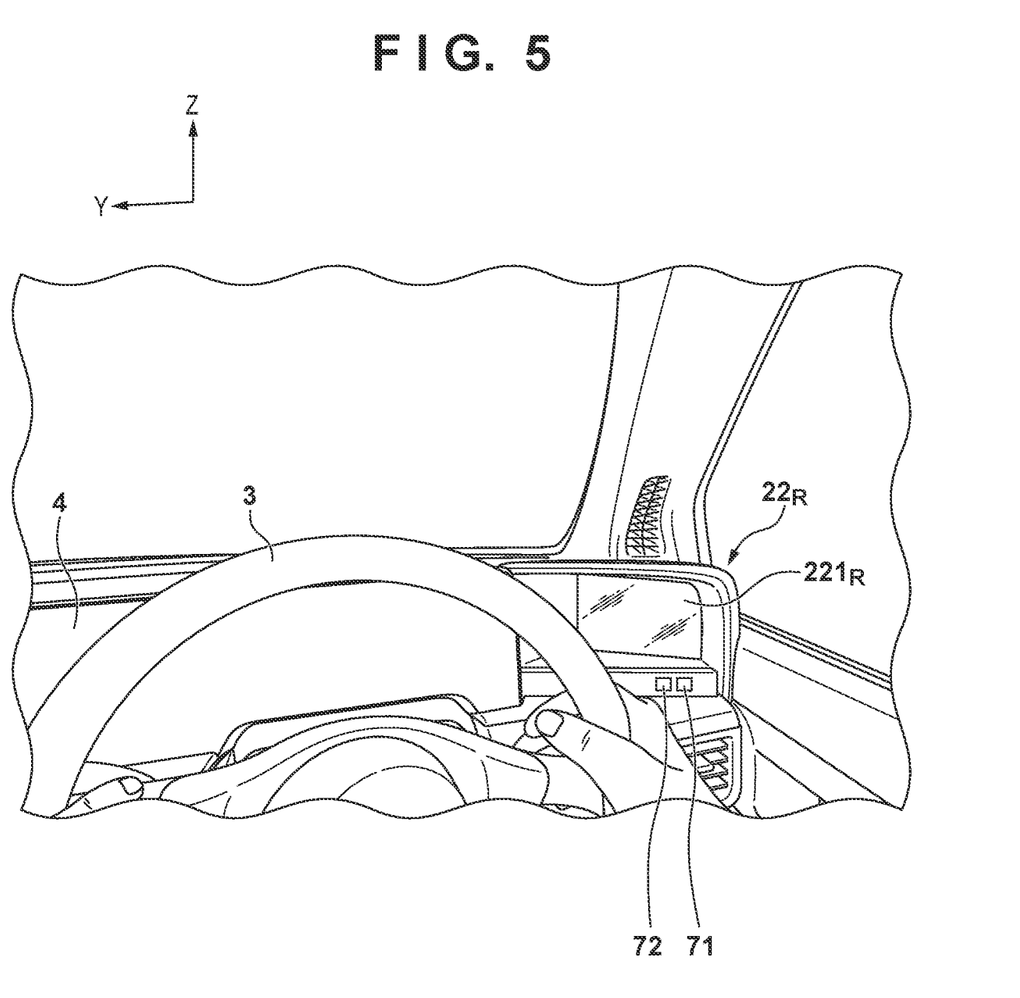
FIG. 5 is a perspective view illustrating part of the forward structure of the vehicle cabin, viewed from the perspective of the driver.

The vehicle body structure of the vehicle 1 will be described next with reference to FIGS. 4 and 5. FIG. 4 is a rear view of a vehicle cabin forward structure 11, and FIG. 5 is a perspective view illustrating part of the vehicle cabin forward structure 11 (mainly the monitor $22_R$ and the surrounding area) from the perspective of the driver, which will be described later. Various types of vehicle components (the dashboard, air conditioner, buttons/switches, and the like) are installed in the vehicle cabin forward structure 11, including, for example, an instrument panel 4 and a monitor 5.

The instrument panel 4 is a part where various instruments (the speedometer, tachometer, fuel gauge, thermometer, odometer, and so on) are provided, and where the results of measurements by those instruments are displayed. The instruments may use an analog or digital display format. In the present embodiment, the instrument panel 4 is arranged forward from the driver's seat, so as to overlap with the steering wheel 3 (described later) when viewed from the rear (from behind). "Viewed from the rear" corresponds to the perspective when viewing from the +X direction, but the same can be said when viewing from the front (the perspective when viewing from the −X direction).

The monitor 5 is provided to the side of the instrument panel 4, as an entity separate from the instrument panel 4. The monitor 5 is capable of displaying map information, as well as moving images such as movies. However, when the shift position is set to reverse (R), the monitor 5 can display an image indicating what is happening behind the vehicle 1. A touch panel display through which touch operations can be entered can be used as the monitor 5.

As can be seen from FIG. 4, the monitor $22_L$ is installed in a left-side end part, and the monitor $22_R$ in a right-side end part, of the vehicle cabin forward structure 11. Installing the monitors in this manner enables the driver to view the monitors $22_L$ and $22_R$ while driving, which makes it possible for the driver to understand what is happening in the left-rearward and right-rearward areas of the vehicle 1 without feeling confused or uncomfortable.

The steering wheel 3 is installed rearward from the vehicle cabin forward structure 11 and forward from the driver's seat. The present embodiment assumes that the right-front seat is the driver's seat and the steering wheel 3 is installed in the right-rearward area of the vehicle cabin forward structure 11. However, as another embodiment, the left-front seat may be the driver's seat, and the steering wheel 3 may be installed in the left-rearward area of the vehicle cabin forward structure 11. In this case, too, the descriptions of the present embodiment apply in a similar manner, and the details of the present embodiment can be applied simply by reversing the left-right symmetry, for example.

The steering wheel 3 includes a rim 31, a hub 32, and spokes 33. The rim 31 is annular, for being gripped by the driver. The hub 32 is provided on the inner side of the annular rim 31, and a horn switch and the like, for example, are installed in the hub 32. The spokes 33 extend between the rim 31 and the hub 32, and optional buttons/switches and the like are installed in the spokes 33. The hub 32 is connected to a steering shaft (not shown), so that when the driver rotates the steering wheel 3, that rotational operation is communicated to the steering shaft as a steering operation. In the drawings, a central position of the outer shape of the rim 31 when viewed from the rear (a position in the center between the upper and lower ends as well as between the left- and right-side ends) is taken as a center H0 of the steering wheel 3, and the upper end of the stated outer shape is taken as an upper end H1 of the steering wheel 3.

As can be seen from FIG. 4, when the steering wheel 3 is oriented so that the vehicle 1 travels straight, the spokes 33 extend in the left-and-right direction when viewed from the rear. Concave parts 34 are formed between the rim 31 and the spokes 33, and for example, the driver can appropriately grip the rim 31 while placing his or her fingers (e.g., his or her thumbs) on the concave parts 34.

An adjustment mechanism 6 is provided in the vehicle cabin forward structure 11, in a location below the steering wheel 3. The adjustment mechanism 6 includes a tilting mechanism and a telescoping mechanism, for example, and the driver can adjust the position and attitude of the steering wheel 3 using those mechanisms.

The monitor $22_L$ includes a display unit $221_L$ capable of displaying an image based on the result of the camera $21_L$ capturing an image (a left-side display unit). The display unit $221_L$ may be referred to as a "screen" or the like. Likewise, the monitor $22_R$ includes a display unit $221_R$ capable of displaying an image based on the result of the camera $21_R$ capturing an image (a right-side display unit). As can be seen from FIG. 4, the display unit $221_R$ is fixed so as to be positioned higher than the center H0 of the steering wheel 3 but lower than the upper end H1 of the steering wheel 3 when viewed from the rear (the same applies to the display unit $221_L$). Installing the monitors $22_L$ and $22_R$ in this manner ensures that the display units $221_L$ and $221_R$ are located in positions that can be easily seen by the driver. In particular, with the vehicle body structure according to the present embodiment, the driver's line of sight to the display unit $221_R$ (or the image displayed in the display unit $221_R$) is unlikely to be blocked, or will substantially not be blocked, by the steering wheel 3.

Here, the driver's line of sight is defined based on prescribed laws such as the regulations provided by the United Nations Economic Commission for Europe (UN/ECE-R46) or the like. Here, the driver's line of sight is assumed to be defined on the basis of "the driver's ocular points", described in chapter II, section 12 of ECE/TRANS/WP. 29/2015/84, found at https://www.unece.org/trans/main/wp29/wp29wgs/wp29gen/gen2015.html.

As can be seen in FIG. 4, in the present embodiment, the display units $221_L$ and $221_R$ are at least partially positioned higher than the spokes 33 when the steering wheel 3 is oriented so that the vehicle 1 travels straight (an attitude where the spokes 33 extend in the left-and-right direction). With the monitors $22_L$ and $22_R$ installed in this manner, the driver's line of sight to the display units $221_L$ and $221_R$ is unlikely to be blocked by the spokes 33 when the driver changes the travel direction of the vehicle 1 (e.g., when changing lanes). To make it possible to achieve this even more favorably, the display units $221_L$ and $221_R$ may further be provided so that at least the upper halves thereof are located higher than the spokes 33.

The display units $221_L$ and $221_R$ are furthermore positioned so that lower end parts thereof overlap with the concave parts 34 when viewed in the Y direction. By installing the monitors $22_L$ and $22_R$ in this manner, the vehicle body structure can be made more compact. At the same time, the driver's line of sight to the display units $221_L$ and $221_R$ is unlikely to be blocked by his or her own hands when gripping the rim 31 with his or her fingers placed on the concave parts 34. Furthermore, for example, a predetermined icon can be displayed in an upper part of the display unit $221_R$ (this will be described later), and the line of sight between the driver and the icon is unlikely to be blocked by the driver's own hand.

Furthermore, the display units $221_L$ and $221_R$ may be positioned so that the edge part of one of the units (the display unit $221_R$, in the present embodiment), located on the inner side in the vehicle width direction, does not overlap with the steering wheel 3, in the driver's line of sight based on the aforementioned regulations (e.g., UN/ECE-R46). By installing the monitors $22_L$ and $22_R$ in this manner, the vehicle body structure can be made even more compact, and the driver need not greatly alter his or her line of sight when checking the display units $221_L$ and $221_R$.

Furthermore, as illustrated in FIG. 4, the display units $221_L$ and $221_R$ are positioned so as to be higher than a bottom end H2 of the instrument panel 4, but lower than a top end H3 of the instrument panel 4, when viewed from the rear. It is assumed that the driver checks the instrument panel 4 as appropriate while driving, and installing the monitors $22_L$ and $22_R$ in this manner makes it possible for the driver to simply shift his or her line of sight to the same height as the instrument panel 4 when checking the display units $221_L$ and $221_R$. Thus according to this type of installation, the driver need not greatly alter the direction of his or her line of sight.

As described above, the position and attitude of the steering wheel 3 can be adjusted by the adjustment mechanism 6. Although it is preferable that the display units $221_L$ and $221_R$ be positioned higher than the center H0 and lower than the upper end H1 regardless of the position and attitude of the steering wheel 3 (see FIG. 4), the positions of the display units $221_L$ and $221_R$ may be set relative to a predetermined position and attitude of the steering wheel 3. For example, the display units $221_L$ and $221_R$ may be positioned higher than the center H0 and lower than the upper end H1 relative to the steering wheel 3 at a position and attitude according to an initial setting. This initial setting can be set as recommended by the dealer, a mechanic, or the like, for example.

Alternatively, the display units $221_L$ and $221_R$ may be positioned higher than the center H0 and lower than the upper end H1 if, for example, the steering wheel 3 has at least been adjusted to the highest position of its pivotable area. It is conceivable that the driver will have the most difficulty seeing the display units $221_L$ and $221_R$ when the steering wheel 3 is at its highest position. Thus the display units $221_L$ and $221_R$ can be in a position easy to see by the driver, regardless of which position and attitude the steering wheel 3 has been adjusted to. For example, it is sufficient for the stated positional relationship to be satisfied when the steering wheel 3 is adjusted furthest toward the rear of the vehicle body and to a vertical attitude.

FIG. 5 is a perspective view of the vehicle cabin forward structure 11, showing the driver's line of sight based on the stated regulations (e.g., UN/ECE-R46). As can be seen from FIG. 5, the display unit $221_R$ (as well as the display unit $221_L$) is fixed at an attitude angled relative to the X direction, so as to be oriented toward the inner side of the vehicle width direction, which makes it easy for the driver to see, and makes it possible to make the vehicle body structure more compact. The manner in which the display units $221_L$ and $221_R$ are fixed may be set to an attitude that can be seen easily by the driver, at a line of sight based on the stated regulations (e.g., UN/ECE-R46).

Figure 8:
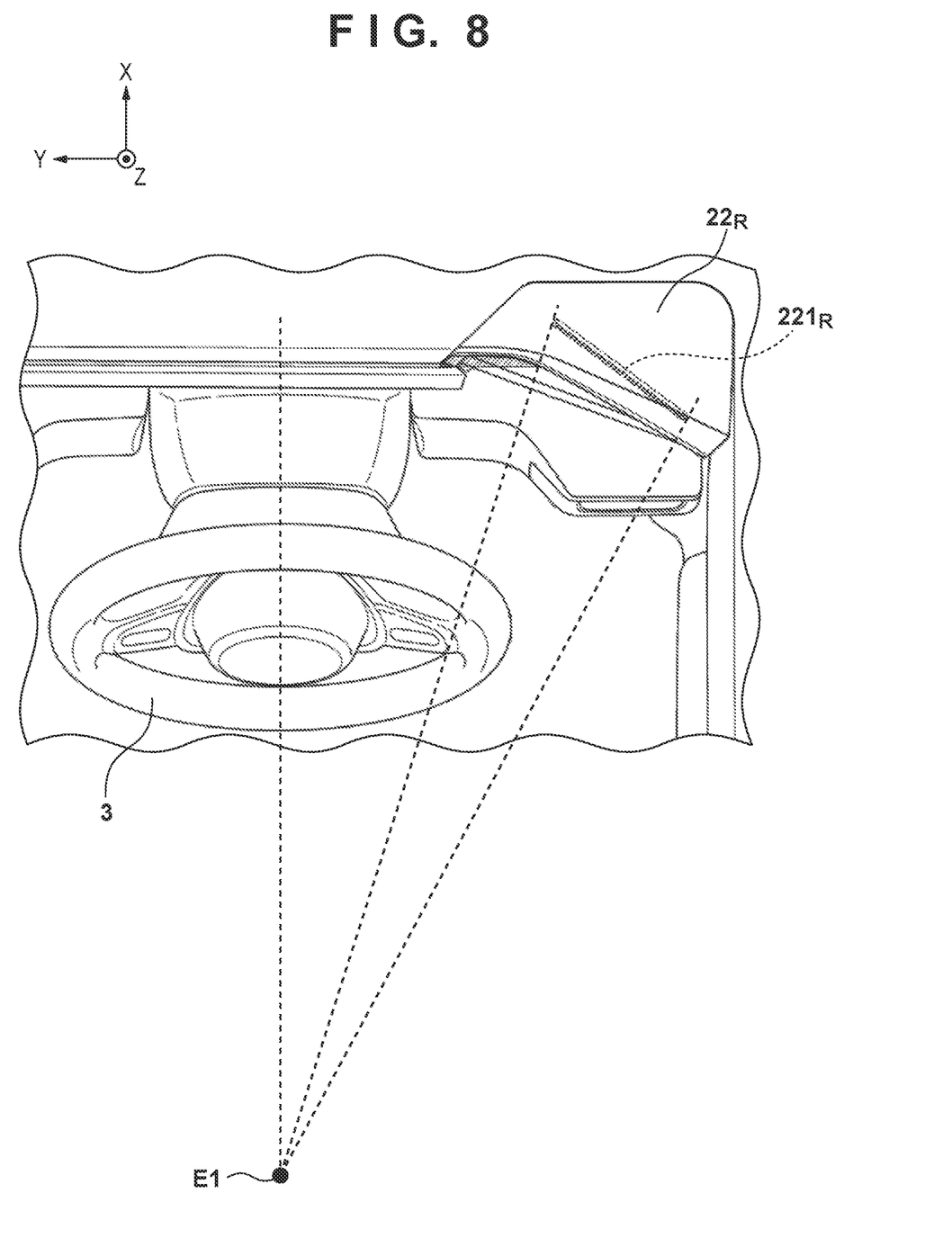
FIG. 8 is a diagram illustrating an example of icons displayed in respective display units.

FIG. 8 is a top view of part of the vehicle cabin forward structure 11 (mainly the area including the steering wheel 3 and the monitor $22_R$). In FIG. 8, a point E1 indicates the position of the driver's eye based on the stated regulations, and the individual broken lines passing through the point E1 are assumed to indicate the driver's line of sight. As can be seen from FIG. 8, when viewed from above (plan view (the perspective when viewed from the −Z direction)), the display unit $221_R$ of the monitor $22_R$ forms a predetermined gap with the steering wheel 3, and is located so as not to overlap therewith in the Y direction. Incidentally, the display unit $221_R$ may be positioned so as to face the steering wheel 3 in a direction perpendicular to the display surface of the unit. Although details will be given later, with the stated line of sight for the driver, the display unit $221_R$ may partially overlap with the steering wheel 3 on the inner side in the vehicle width direction. However, the predetermined legal visual field to be displayed in the display unit $221_R$ is substantially not blocked by the steering wheel 3. By installing the monitor $22_R$ in this manner, the vehicle body structure can be made even more compact, and the driver can see the display unit $221_R$ as appropriate while driving.

Referring again to FIG. 5, one or more indicators are provided below the monitor $22_R$, namely indicators 71 and 72. The indicator 71 is a display lamp for communicating other information to the driver, such as warning him or her that another vehicle is approaching from the rear or rear-side area. The indicator 72 is a display lamp for warning the driver that an unanticipated state has arisen in the driving assistance apparatus 2, e.g., that the monitors 22 have been damaged or the like. The indicators 71 and 72 are preferably positioned so that the driver's line of sight thereto is not blocked by his or her own hands. In the present embodiment, the indicators 71 and 72 are located further from the steering wheel 3 than the center of the monitor $22_R$ with respect to the left-and-right direction thereof. Furthermore, the indicators 71 and 72 are both provided near the monitor $22_R$, and can therefore be seen by the driver with ease.

Figure 6:
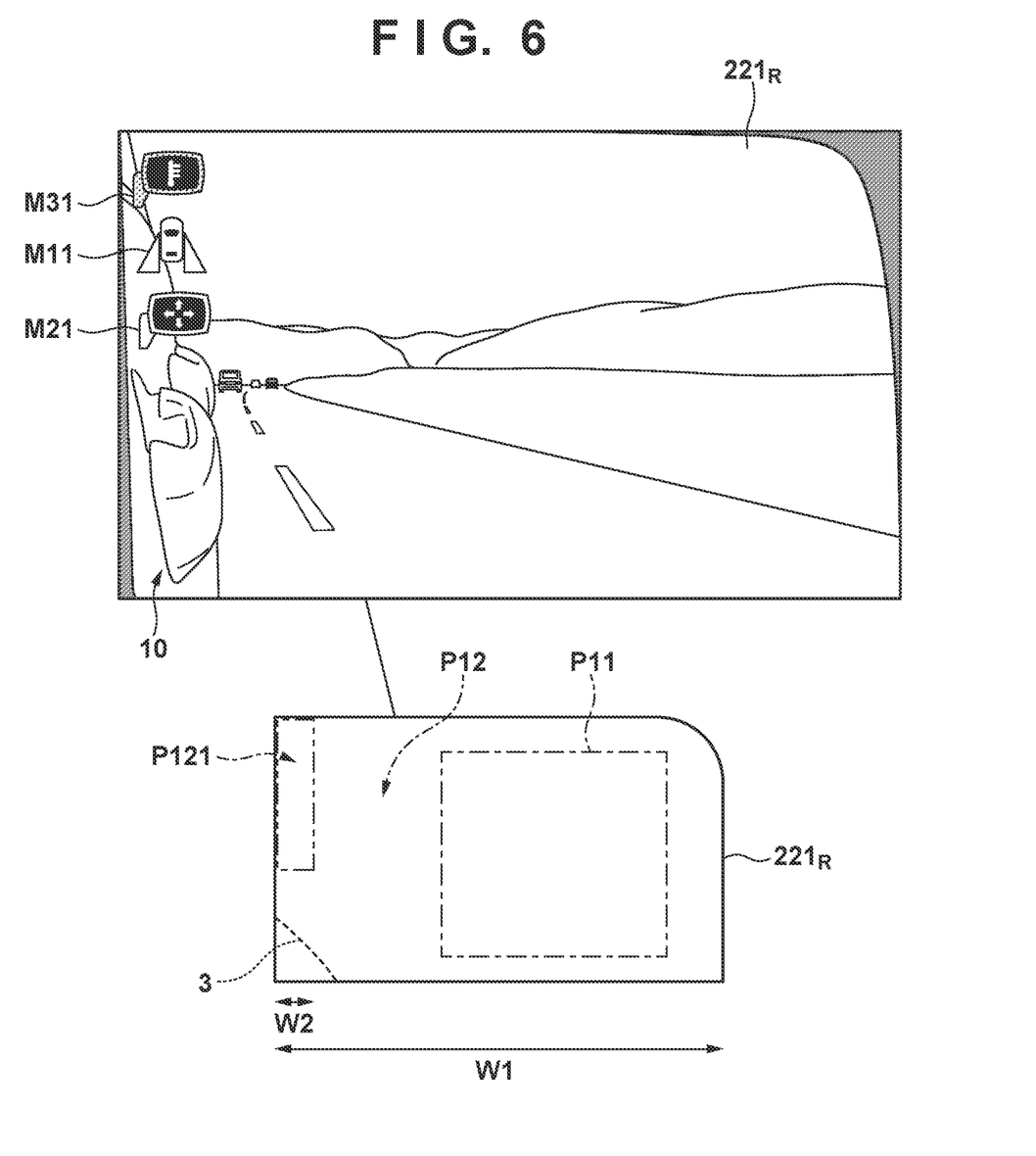
FIG. 6 is a diagram illustrating an example of content displayed in a right-side display unit.

FIG. 6 illustrates an example of an image displayed in the display unit $221_R$ of the monitor $22_R$. As described earlier, the image in the display unit $221_R$ is displayed by the control unit 23 controlling the driving of the display unit $221_R$. Although the following describes the image displayed in the display unit $221_R$, the same can be said for the display unit $221_L$.

An image indicating what is happening in the right-rearward area of the vehicle 1 is displayed in the display unit $221_R$, and the vehicle body 10 also appears at the inner edge (the left side) in the vehicle width direction. Here, in an initial state at least, the vehicle body 10 is displayed at the inner edge of the display unit $221_R$ in the vehicle width direction. This initial state corresponds to the state of settings when starting the engine of the vehicle 1 (when turning the ignition on or turning a start switch on), and is a state of settings recommended by the dealer, a mechanic, or the like, for example. As a result, the driver can appropriately understand the relative positional relationship between his or her own vehicle and the area displayed in the display unit $221_R$ before starting to drive. Note that the information displayed at the upper edge of the display unit $221_R$ on this inner side in the vehicle width direction (i.e., the edge where the vehicle body 10 is displayed) can be thought of as having relatively low importance while the driver is driving. It is therefore acceptable for the stated edge to partially overlap with the steering wheel 3 in the direction of the driver's line of sight, based on the stated regulations.

Although details will be given later, in this image, a predetermined icon M11 and the like can be displayed as necessary in the display unit $221_R$, in positions overlapping with the vehicle body 10 in the top-and-bottom direction. Note that the driver can adjust the visual field range (the area displayed in the monitors 22) after starting the engine and before starting to drive. If the vehicle body 10 has exited the frame of the display unit $221_R$ due to the visual field range being adjusted, the stated icon M11 and the like do not overlap with the vehicle body 10 in the top-and-bottom direction.

A schematic diagram for illustrating the display unit $221_R$ in detail is further given in the lower section of FIG. 6. As indicated in this schematic diagram, the display unit $221_R$ includes a central part (or central area) P11 and a surrounding part (or surrounding area) P12. A predetermined legal visual field is displayed in the central part P11. The predetermined legal visual field is an area that should be visible to the driver while driving, and corresponds to a visual field defined in chapter II, section 15 of UN/ECE-R46, for example. Furthermore, in the schematic diagram, the part of the steering wheel 3 (the rim 31) that may overlap with the display unit $221_R$ in the driver's line of sight based on the stated regulations is indicated by a broken line. The central part P11 does not overlap with the steering wheel 3 in the driver's line of sight based on the regulations, and it is preferable that if these elements do overlap with each other in another perspective of the driver, the stated visual field range be adjusted.

The surrounding part P12 includes a corner part P121 in the upper area on the side where the vehicle body 10 is located. One of the icon M11 and the like (described later) can be displayed, or a plurality of such icons can be displayed in a row in the top-and-bottom direction, in the corner part P121 as necessary. The icon M11 and the like are marks for communicating predetermined information to the driver. The icons are formed from one or more of a graphic, a symbol, text, and the like, and preferably enable the meaning of the icon to be visually recognized with ease.

Figure 7:
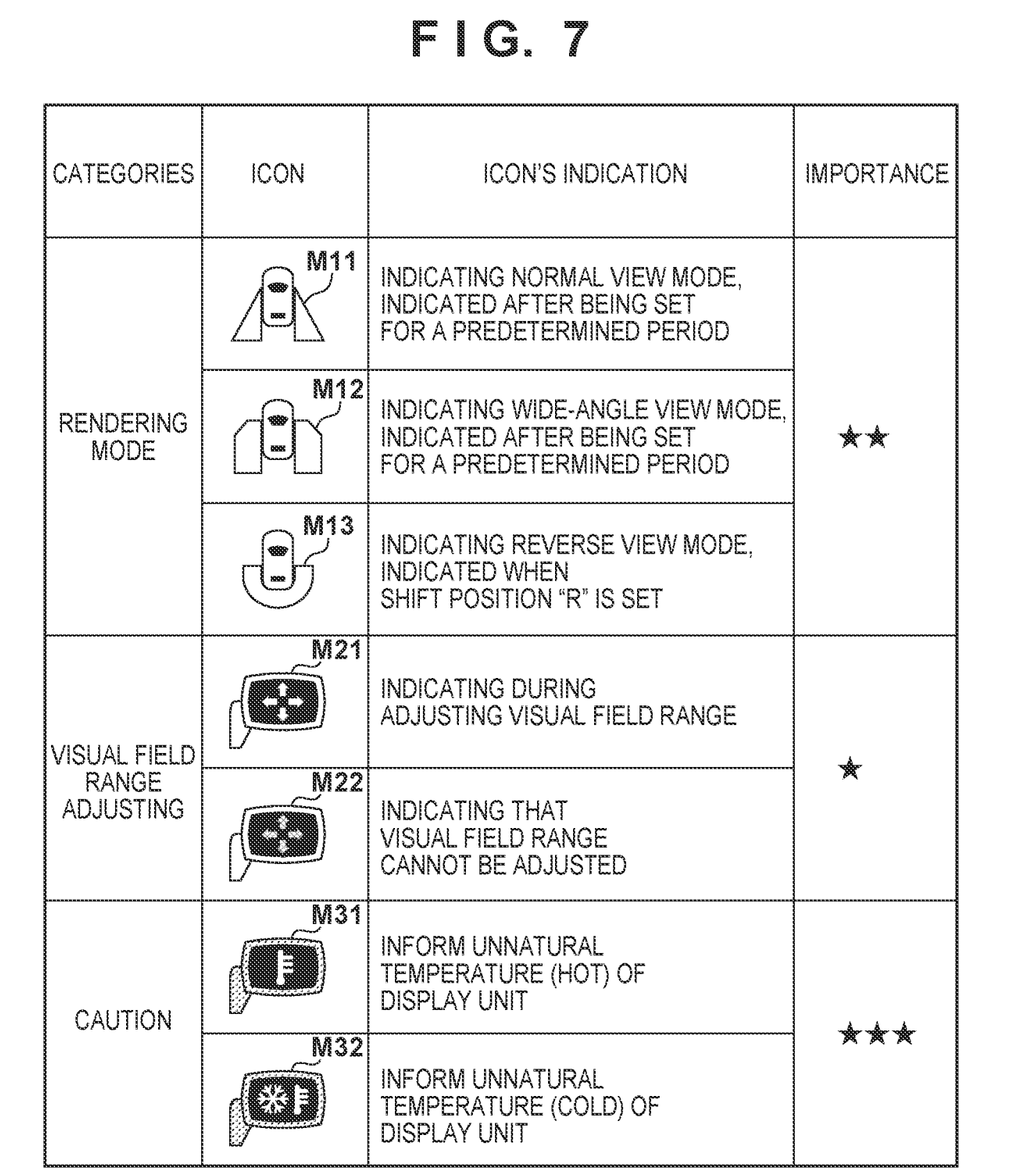
FIG. 7 is a diagram illustrating an example of icons displayed in respective display units.

FIG. 7 illustrates several examples of the icons that can be displayed in the display unit $221_R$. (The same applies to the display unit $221_L$, although this will not be described here.) In the present embodiment, the icons are classified according to three categories, for example. For example, icons M11, M12, and M13 are used as icons for indicating a rendering mode. Icons M21 and M22 are used as icons for indicating whether or not the visual field can be adjusted, for example. Finally, icons M31 and M32 are used as icons for indicating whether or not the driver should take caution, for example.

The icon M11 indicates that the display state of the display unit $221_R$ is a normal view mode. For example, the icon M11 indicates that part of the image data obtained by the camera $21_R$ has been trimmed, and that an image corresponding to that part is being displayed in the monitor 22. The icon M12 indicates that the display state of the display unit $221_R$ is a wide-angle view mode. The icon M12 indicates that part of the image data has been trimmed at a wider range than in the normal view mode, and that an image corresponding to that part is being displayed in the monitor 22 in a partially-compressed state, for example. In the present embodiment, the wide-angle view mode enables the driver to see what is happening behind the vehicle body 10 over a broader range than when using the normal view mode. The icon M13 indicates a reverse view mode. For example, when the shift position is set to reverse (R), the icon M13 is displayed in the monitor 22 and an image of the area behind the vehicle 1 is displayed in the monitor 5.

The icon M21 indicates that the visual field range (the area displayed in the monitor 22) is being adjusted. That is, the icon M21 is displayed while the driver is adjusting the visual field range using the implement. The icon M22 indicates a state in which the visual field range cannot be adjusted, i.e., that the visual field range will not change even if the driver manipulates the implement.

The icon M31 indicates that the display unit $221_R$ is relatively hot. The image quality may drop when the display unit $221_R$ is hot (e.g., 70° C. or higher), and thus displaying the icon M31 along with the image in the display unit $221_R$ can ensure the driver takes appropriate caution. Reducing the brightness of the backlight or suppressing the driving power of the pixels, for example, are conceivable as a way to prevent a drop in image quality when the display unit $221_R$ is hot. Even in such a case, it is preferable that the icon M31 be displayed in the display unit $221_R$ along with the image. The icon M32 indicates that the display unit $221_R$ is relatively cold. The image quality may drop when the display unit $221_R$ is cold as well (e.g., −20° C. or lower), and thus displaying the icon M32 along with the image in the display unit $221_R$ can ensure the driver takes appropriate caution.

Displaying the above-described various icons in the display unit $221_R$ makes it possible to communicate diverse types of information to the driver. Of these icons, one icon corresponding to each category can be displayed in the display unit $221_R$ as necessary. For example, one of the icons M11, M12, and M13 can be displayed in the display unit $221_R$ as an icon indicating the rendering mode. Additionally, one of the icons M21 and M22 can be displayed in the display unit $221_R$ as an icon indicating whether or not the visual field can be adjusted. Furthermore, one of the icons M31 and M32 can be displayed in the display unit $221_R$ as an icon for prompting the driver to take caution.

The information indicated by the above-described icon M11 and the like may have varying levels of importance (priority) in terms of the driver driving properly. For example, the icons M31 and M32 for prompting the driver to take caution can be said to have a higher level of importance than the icons M11, M12, and M13, which indicate the rendering mode. However, the icons M21 and M22, which indicate whether or not the visual field can be adjusted, can be said to have a lower level of importance than the icons M11, M12, and M13, which indicate the rendering mode. It can be said that icons indicating information with a high level of importance should be displayed in positions that are easier for the driver to see than other icons.

Referring again to FIG. 6, the icons M31, M11, and M21 are displayed in that order from top to bottom. In other words, in the present embodiment, icons indicating information having a relatively high level of importance are displayed in the upper part of the corner part P121, while icons indicating information having a relatively low level of importance are displayed in the lower part of the corner part P121. As illustrated in FIG. 6, in the present embodiment, the lower part of the corner part P121 overlaps with the steering wheel 3 in the driver's line of sight, and thus the vehicle body structure can be made more compact. However, icons indicating information having a relatively low level of importance are displayed in the bottom part of the corner part P121, and thus there is substantially no impact on the driving by the driver.

The corner part P121 in which the icon M11 and the like are displayed preferably occupies an end area that is no more than 20% of the horizontal direction width of the display unit $221_R$. For example, when the width of the display unit $221_R$ in the horizontal direction is taken as a width W1, the corner part P121 occupies an end part having a width W2, with the following holding true:

$$W2 \leq W1 \times \tfrac{1}{5}$$

The widths W1 and W2 may be determined on the basis of the respective numbers of pixels. In other words, the foregoing formula can be calculated on the basis of the ratio of the number of pixels corresponding to the width W2 (e.g., 100) to the number of pixels corresponding to the width W1 (e.g., 800).

As described above, in the present embodiment, the display unit $221_R$ is positioned higher than the center H0 of the steering wheel 3. As such, the driver's line of sight aimed at the icon M11 and the like is substantially not blocked by the steering wheel 3.

Furthermore, in the present embodiment, when the icons M31, M11, and M21 are displayed in the display unit $221_R$, the other icons M11 and M21 remain in their display positions even if the icon M31 is hidden (e.g., the icons are not shifted upward). This makes it possible for the driver to quickly check the display positions in the display unit $221_R$ and the icons displayed in those positions, which in turn makes it possible to recognize the details communicated by the icon M11 and the like in a relatively short amount of time.

To summarize the display format used for the display unit $221_R$, the result of the camera $21_R$ capturing an image is displayed in the display unit $221_R$ as an image, and the predetermined icon M11 and the like are displayed on top of the image (the result of capturing an image) in the corner part P121. Using this display format makes it possible for the driver to appropriately understand what is happening in the right-rearward area of the vehicle body 10, and the icon M11 and the like can be viewed without interfering with that understanding. Because the icon M11 and the like are displayed on top of the image, the icons may be displayed with a predetermined level of transparency.

To elaborate further, the monitor $22_R$ replaces the side view mirror. As such, it can be said that in the image displayed in the display unit $221_R$, the driver is less interested in the vehicle body 10, and is more interested in areas distanced from the vehicle body 10 (e.g., whether or not there is a following vehicle in an adjacent lane). Thus by displaying the icon M11 and the like in a position that overlaps with the vehicle body 10 in the top-and-bottom direction, the driver's obtainment of information from the display unit $221_R$ is substantially not hindered. The same applies for the display unit $221_L$.

The display unit $221_R$ (and the image displayed in the display unit $221_R$) has an outer shape in which the side edge on the vehicle body side (here, the left side) is slanted with respect to the top-and-bottom direction. In other words, this side end extends in a direction angled relative to the top-and-bottom direction. Here, the display unit $221_R$ is fixed at a tilted attitude so as to face the inner side of the vehicle width direction (as described earlier), and by facing even further inward in the vehicle width direction relative to the driver's line of sight, the display surface of the display unit $221_R$ is not orthogonal to the line of sight. Thus having the side edge of the display unit $221_R$ extending from top to bottom so as to be positioned on the outer side in the vehicle width direction, as illustrated in FIG. 6, makes it possible to display an image without imparting a sense of unnaturalness on the driver (display an image that does not seem distorted).

The present embodiment describes the icon M11 and the like as being arranged in the top-and-bottom direction and displayed. However, as another embodiment, the icon M11 and the like may be arranged and displayed in a direction tilted relative to the top-and-bottom direction, in the same manner as the stated side edge (the left side of the display unit $221_R$). This makes it possible to improve the image design. This also makes it even less likely that the driver's line of sight aimed at the icon M11 and the like will be blocked by the steering wheel 3. Furthermore, in this case, the direction in which the side edge of the display unit $221_R$ extends and the direction in which the icon M11 and the like are arranged may or may not be parallel to each other.

The embodiment as described thus far can be said to provide usability improvements from a variety of perspectives. For example, the control unit 23, which controls the driving of the monitors $22_L$ and $22_R$, causes the predetermined icon M11 and the like to be displayed on top of an image (a result of capturing an image), at the location of the corner part P121 in each of the display units $221_L$ and $221_R$. Accordingly, the driver can appropriately understand what is happening in the left- and right-rearward areas of the vehicle 1, and the predetermined icons can be viewed without interfering with that understanding. This is advantageous in terms of improved usability.

While several preferred embodiments have been described above, the present invention is not intended to be limited thereto, and may be partially changed without departing from the essential spirit of the present invention. For example, a given embodiment may be combined with part of another embodiment in accordance with the purpose or the like. Furthermore, terms used in the specification to indicate various elements are used only for the purpose of describing the present invention. The present invention is not intended to be limited to the strict meanings of those terms, and also includes meaning equivalent thereto.

The various features of the above-described embodiments will be summarized next.

A first aspect is directed to a driving assistance apparatus (e.g., 2) installed in a vehicle. The apparatus includes: an image capturing unit (e.g., 21) configured to capture an image of a left-rearward area and a right-rearward area of the vehicle (e.g., 1); a display unit (e.g., 22) configured to display an image capturing result from the image capturing unit as an image; and a control unit (e.g., 23) configured to control the driving of the display unit. The control unit causes an icon (e.g., M11 or the like) for communicating predetermined information to a driver to be displayed over the image capturing result, at a position of a corner part (e.g., P121) corresponding to an upper part on a vehicle body side of the image displayed by the display unit.

Accordingly, the driver can appropriately understand what is happening in the left-rearward area and the right-rearward area of the vehicle, the predetermined icon can be checked without interfering with that understanding, and as a result, the usability can be improved.

According to a second aspect, the display unit includes a left-side display unit (e.g., $221_L$) configured to display the left-rearward area and a right-side display unit (e.g., $221_R$) configured to display the right-rearward area; and the control unit causes the icon to be displayed in the corner parts of the left-side display unit and the right-side display unit.

Accordingly, icons can be displayed in the left-side display unit and the right-side display unit. For example, information required by or useful for the driver can be displayed individually in the left-side display unit and the right-side display unit.

According to a third aspect, a plurality of the icons are arranged and displayed in a top-and-bottom direction in the corner part.

Accordingly, diverse types of information can be communicated to the driver without substantially interfering with the driver's understanding of what is happening in the left-rearward area and the right-rearward area of the vehicle.

According to a fourth aspect, a side edge of the image, located on the vehicle body side, extends in a direction tilted relative to a top-and-bottom direction; and a plurality of the icons are arranged and displayed in the direction tilted relative to the top-and-bottom direction in the corner part.

Accordingly, diverse types of information can be communicated to the driver, and the image design can be improved, without substantially interfering with the driver's understanding of what is happening in the left-rearward area and the right-rearward area of the vehicle.

According to a fifth aspect, the side edge extends from top to bottom so as to be located on an outer side in a vehicle width direction; and the plurality of icons are displayed from top to bottom so as to be located on the outer side in the vehicle width direction.

Accordingly, the driver's line of sight to the plurality of icons is less likely to be blocked by the steering wheel.

According to a sixth aspect, the display unit further includes a display section (e.g., $221_L$ and $221_R$) capable of displaying the image; and the corner part where the icon is displayed is present in an end area (e.g., the area having the width W2) that is no greater than 20% of the width of the display section in the horizontal direction.

This makes it possible to more favorably realize the above-described first aspect.

According to a seventh aspect, the display unit further includes a display section (e.g., $221_L$ and $221_R$) capable of displaying the image; the display section includes a central part (e.g., P11), and a surrounding part (e.g., P12) that surrounds the central part and includes the corner part; and the control unit causes a predetermined legal visual field to be displayed in the central part.

This makes it possible to more favorably realize the above-described first aspect.

According to an eighth aspect, the display unit further includes a display section (e.g., $221_L$ and $221_R$) capable of displaying the image; the control unit is configured to cause the vehicle body (e.g., 10) to be displayed in an end part of the display section on the inner side in a vehicle width direction (e.g., the Y direction), when in an initial state; and the control unit causes the icon to be displayed in a position overlapping, in the top-and-bottom direction, with the vehicle body displayed in the display section in the initial state.

This makes it possible to more favorably realize the above-described first aspect.

A ninth aspect is directed to a vehicle (e.g., 1), the vehicle including the above-described driving assistance apparatus.

The above-described driving assistance apparatus can be installed in a typical vehicle.

According to a tenth aspect, the display unit further includes a display section (e.g., $221_L$ and $221_R$) capable of displaying the image; and when the vehicle body is viewed in the front-and-rear direction (e.g., the X direction), the display section is positioned at the same level as an instrument panel (e.g., 4) with respect to the vehicle width direction (e.g., the Y direction), and higher than the center (e.g., H0) of a steering wheel (e.g., 3).

Accordingly, the driver's line of sight aimed at the icon is substantially not blocked by the steering wheel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A driving assistance apparatus installed in a vehicle, the apparatus comprising:
an image capturing device configured to capture an image of a left-rearward area and a right-rearward area of the vehicle;
a display device configured to display, on a display section, an image capturing result from the image capturing device as an image; and
an electronic controller having a central processing unit and a memory configured to control the driving of the display device,
wherein the electronic controller causes a plurality of icons for communicating predetermined information to a driver to be displayed over the image capturing result, on the display section, at a position of a corner part corresponding to an upper part on a vehicle body side of the image displayed by the display device, the plurality of icons including a caution icon for prompting the driver to take caution by indicating that the display unit is hotter and/or colder than a reference range, and the plurality of icons being displayed in a top-and-bottom direction in a predetermined order such that the caution icon is displayed above the other icons,
when the vehicle body is viewed in the front-and-rear direction, the display section is positioned at the same level as an instrument panel with respect to the vehicle width direction, and higher than the center of a steering wheel,
the display device includes a left-side display device configured to display the left-rearward area, and a right-side display device configured to display the right-rearward area, and
the electronic controller causes the icon to be displayed in the corner parts of the left-side display device and the right-side display device.

2. The driving assistance apparatus according to claim 1, wherein a plurality of icons are displayed in the top-and-bottom direction, such that an icon with higher importance is positioned in an upper part of the corner part and an icon with lower importance is positioned in a lower part of the corner part.

3. The driving assistance apparatus according to claim 1, wherein a side edge of the image, located on the vehicle body side, extends in a direction tilted relative to a top-and-bottom direction; and
a plurality of the icons are arranged and displayed in the direction tilted relative to the top-and-bottom direction in the corner part.

4. The driving assistance apparatus according to claim 3, wherein the side edge extends from top to bottom so as to be located on an outer side in a vehicle width direction; and
the plurality of icons are displayed from top to bottom so as to be located on the outer side in the vehicle width direction.

5. The driving assistance apparatus according to claim 1, wherein the corner part where the icon is displayed is present in an end area that is no greater than 20% of the width of the display section in the horizontal direction.

6. The driving assistance apparatus according to claim 1, wherein the display section includes a central part, and a surrounding part that surrounds the central part and includes the corner part; and
the electronic controller causes a predetermined legal visual field to be displayed in the central part.

7. The driving assistance apparatus according to claim 1, wherein the electronic controller is configured to cause the vehicle body to be displayed in an end part of the display section on the inner side in a vehicle width direction, when in an initial state; and
the electronic controller causes the icon to be displayed in a position overlapping, in the top-and-bottom direction, with the vehicle body displayed in the display section in the initial state.

8. A vehicle comprising:
the driving assistance apparatus according to claim 1; and
a wheel.

9. The driving assistance apparatus according to claim 1, wherein a lower part of the display section on a vehicle body side overlaps with the steering wheel in a driver's line of sight.

* * * * *